(12) United States Patent
Coren et al.

(10) Patent No.: US 9,519,476 B2
(45) Date of Patent: Dec. 13, 2016

(54) METHODS, APPARATUS AND ARTICLES OF MANUFACTURE TO AUTOCOMPLETE APPLICATION LIFECYCLE MANAGEMENT ENTITIES

(75) Inventors: Itzhak Coren, Cochav Yair (IL); Tomer Engel, Sunnyvale, CA (US); Alon Zanbar, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 1490 days.

(21) Appl. No.: 13/074,720

(22) Filed: Mar. 29, 2011

(65) Prior Publication Data

US 2012/0254823 A1    Oct. 4, 2012

(51) Int. Cl.
G06F 9/44    (2006.01)

(52) U.S. Cl.
CPC ........................ G06F 8/70 (2013.01)

(58) Field of Classification Search
CPC ................. G06F 8/00–8/20; G06F 8/35–8/36; G06F 8/70–8/76
See application file for complete search history.

(56) References Cited

U.S. PATENT DOCUMENTS

| | | | |
|---|---|---|---|
| 6,226,792 B1 * | 5/2001 | Goiffon et al. ............... | 717/120 |
| 7,278,133 B2 | 10/2007 | Roman et al. | |
| 7,483,915 B2 | 1/2009 | Thompson et al. | |
| 7,739,316 B2 | 6/2010 | Thompson et al. | |
| 7,788,536 B1 | 8/2010 | Qureshi et al. | |
| 7,966,346 B1 * | 6/2011 | Jameson ....................... | 707/796 |
| 2008/0288856 A1 | 11/2008 | Goranson et al. | |
| 2009/0216728 A1 | 8/2009 | Brainerd et al. | |
| 2010/0211924 A1 * | 8/2010 | Begel et al. .................. | 717/101 |
| 2010/0229155 A1 | 9/2010 | Adiyapatham et al. | |

OTHER PUBLICATIONS

Lock, S., et al., "Systematic Change Impact Determination in Complex Object Database Schemata," Proceedings of the European Conference on Object Oriented Porgramming [online], 1999 [retrieved Nov. 15, 2013], Retrieved from Internet: <http://www.comp.lancs.ac.uk/computing/aose/papers/SADES_PhDOOS1999.pdf>, pp. 1-10.*

Identify, v., Oxford English Dictionary, $2^{nd}$ Ed. [online], 1989 [retrieved Dec. 10, 2014], Retrieved from Internet: <URL: http://www.oed.com/oed2/00111219>, pp. 1-2.*

* cited by examiner

*Primary Examiner* — Todd Aguilera
(74) *Attorney, Agent, or Firm* — Hanley Flight & Zimmerman, LLC

(57) ABSTRACT

Example methods, apparatus and articles of manufacture to autocomplete application lifecycle management (ALM) entities are disclosed. A disclosed example method includes obtaining an action associated with an ALM entity, and tracing an ALM repository starting with the ALM entity to automatically identify a connected set of entities and relationships that complete the action.

13 Claims, 3 Drawing Sheets

METHODS, APPARATUS AND ARTICLES OF MANUFACTURE TO AUTOCOMPLETE APPLICATION LIFECYCLE MANAGEMENT ENTITIES

BACKGROUND

Application lifecycle management (ALM), which is also known as application management, is a process to manage the lifecycle of an application from inception to retirement. ALM combines business management and software engineering to facilitate and/or integrate requirements management, architecture, coding, testing, tracking, and release management.

DETAILED DESCRIPTION

Figure 1:
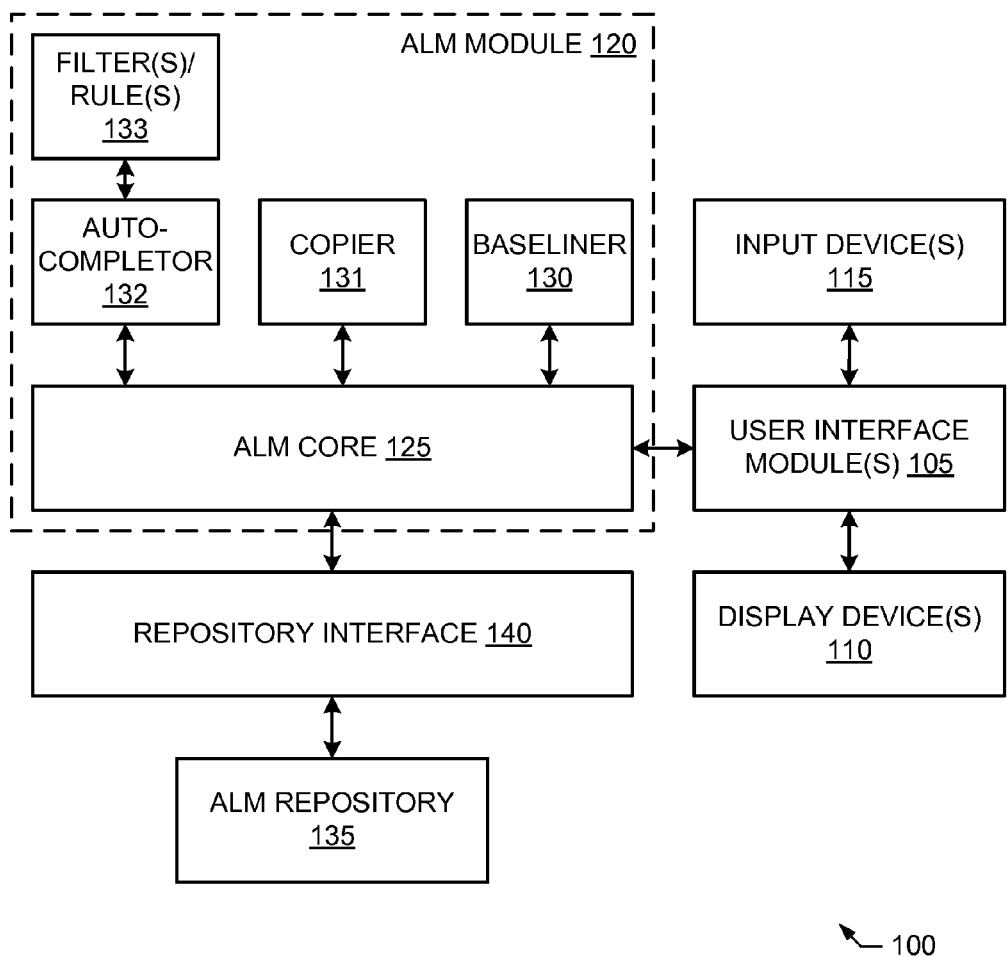
FIG. 1 is an example workstation constructed in accordance with the teachings of this disclosure to autocomplete ALM entities.

As used herein, an application lifecycle management (ALM) model or graph refers to a plurality of ALM entities and relations between those entities. ALM entities are intellectual and/or business assets such as tests and/or requirements that are developed using an ALM tool such as one or more modules of HP® ALM, which is sold by Hewlett-Packard®, the assignee of this patent. Example ALM entities include, but are not limited to, a requirement, a test to determine whether a requirement is satisfied, a result of an execution of a test, a resource such as a script or a program to execute a test, and/or an attachment such as an image, a document and/or a video. ALM relations define logical connections between two entities. Example hierarchical relations include, but are not limited to, contain, compose and/or attach. Example connecting relations include, but are not limited to, realizes, uses and/or depends on. An example ALM graph includes a test (a first entity) connected to both a result of an execution of the test (a second entity) and a script to execute the test (a third entity). In some examples, an ALM model and/or graph may be represented and/or defined by one or more extensible spring based eXtensible Markup Language (XML) files and/or associated logic. Additionally or alternatively, an ALM model and/or graph may be represented by one or more logical object model (LOM) files.

ALM tools such as HP ALM may be used to manage a large number of entities and/or complex relations among these entities, and/or to enable actions (e.g., copy and/or baseline) to be performed on a set of entities and relations. The effort to ascertain the optimal, sufficient and/or necessary set of entities and relations needed to complete, implement and/or carry out an action is increasing as the scale and/or complexity of enterprise applications increases. Assigning a user to manually perform this task is not only time consuming but is error prone. For example, the identified set may be too large (e.g., including unneeded, obsolete and/or confusing entities and relations) or, more problematically, too small (e.g., excluding entities and relations needed for that action).

To overcome at least these challenges, example methods, apparatus and articles of manufacture to autocomplete ALM entities are disclosed herein. As used herein, autocompletion of an ALM entity refers to the automatic identification and/or determination of the set of entities and relations required and/or needed to complete, implement and/or carry out an action associated with that ALM entity. In other words, given the ALM entity and the action, autocompletion refers to the automatic identification of a necessary and sufficient set of entities and relations for the action to be correct, coherent, and complete. As used herein, an action is complete, correct and/or coherent when all entities and/or relations required and/or needed to carry out and/or implement the action are included without the inclusion of any unneeded entities and/or relations. Because the examples disclosed herein may be used to automatically complete an ALM entity, users are unburden from manually identifying entities and/or relations, and the sufficiency and necessity of the set of identified entities and/or relations can be ensured. That is, the set of identified entities and/or relations contains only the entities relations necessary to carry out the action without containing any excess and/or unneeded entities and/or relations.

The examples disclosed herein implement a generic, extensible and configurable framework to manage and/or utilize ALM graph traversal rules. Given one or a set of entry and/or initial entities, the examples disclosed herein iteratively discover and/or traverse an ALM model and/or graph to automatically identify and/or ascertain an optimal, sufficient and/or necessary set of entities and relations needed to complete, implement and/or carry out an action associated with those ALM entities. As disclosed herein, graph traversal rules are configurable and/or enforceable per action.

Autocompletion may be used, for example, to implement any number and/or type(s) of function(s) and/or use case(s) within an ALM tool. For example, autocompletion may be used to: (a) capture a baseline, which is a snapshot of a set of entities and/or relations at a particular point in time; (b) copy one or more entities between two projects, including all related entities and/or relations; and/or (c) create a filtered set of entities such as defects, tests planned and/or executed for project planning and/or tracking purposes.

A disclosed example method to autocomplete an ALM entity includes obtaining an action associated with the ALM entity, and tracing an ALM repository starting with the ALM entity to automatically identify a connected set of entities and relationships that complete the action.

A disclosed example apparatus to autocomplete an ALM entity includes a interface module to obtain an action associated with the ALM entity, and an autocompletor to trace an ALM repository starting with the ALM entity to automatically identify a connected set of entities and relationships that complete the action.

FIG. 1 illustrates an example workstation 100 to autocomplete ALM entities. To allow a user to interact with the example workstation 100 of FIG. 1, the workstation 100 of FIG. 1 includes any number and/or type(s) of user interface module(s) 105, any number and/or type(s) of display device(s) 110, and any number and/or type(s) of input device(s) 115. The example user interface module(s) 105 of FIG. 1 implements an operating system to present one or more graphical user interfaces and/or to present information at the display device(s) 110, and to allow the user to control, configure and/or operate the example workstation 100. The user provides and/or makes inputs and/or selections to the user interface module(s) 105 and/or, more generally, to the example workstation 100 via the input device(s) 115. Example input device(s) 115 include, but are not limited to, a keyboard, a touch screen and/or a mouse.

To implement ALM functionality, the example workstation 100 of FIG. 1 includes an ALM module 120. The example ALM module 120 of FIG. 1 includes an ALM core 125 that provides and/or implements basic ALM functional and/or building blocks and/or ALM functions of the ALM module 120. The functionality of the example ALM module 120 of FIG. 1 is extensible via ALM sub-modules 130-132 implemented on top of the example ALM core 125. In other words, the example ALM sub-modules 130-132 utilize core ALM functionality implemented by the example ALM core 125 to implement higher level functionality such as ALM project copying and/or creation of ALM baselines.

To create ALM project baselines, the example ALM module 120 of FIG. 1 includes a baseliner 130. Starting with one or more ALM entities identified by a user via the input device(s) 115 and the user interface module(s) 105, the example baseliner 130 of FIG. 1 directs an autocompleter 132 to automatically identify the set of entities and/or relations linked to the identified entities, and saves the identified set as an ALM baseline. By using the example autocompleter 132 to automatically identify the set of entities and/or relations, the ALM baseline will include all of the entities and/or relations associated with the identified ALM entities.

To copy ALM projects and/or information contained in ALM projects, the example ALM module 120 of FIG. 1 includes a copier 131. Starting with one or more ALM entities identified by a user via the input device(s) 115 and the user interface module(s) 105, the example copier 131 of FIG. 1 directs the example autocompleter 132 to automatically identify the set of entities and/or relations linked to the identified entities, and copies the identified entities and/or relations from a first ALM project to a second ALM project. By using the example autocompleter 132 to automatically identify the set of entities and/or relations, the second ALM project will include all of the entities and/or relations associated with the identified ALM entities To autocomplete ALM entities, the example ALM module 120 of FIG. 1 includes the example autocompleter 132. Given one or more initial ALM entities and an action, the example autocompleter 132 of FIG. 1 automatically traverses through an ALM repository and/or database 135 to automatically identify a necessary and/or sufficient set of entities (i.e., descendants of the initial ALM entities) and/or relations for the action to be correct, coherent, and complete. In some examples, the example autocompleter 132 applies one or more user-configurable and/or user-definable logical filter(s) 133 that cause the autocompleter 132 to include and/or exclude certain entities and/or relations while autocompleting ALM entities. An example logical filter 133 causes the autocompleter 132 to not include covering tests. An example process that may be carried out to implement the example autocompleter 132 of FIG. 1 is described below in connection with FIG. 2.

ALM project information may be stored in the example ALM repository and/or database 135 of FIG. 1 using any number and/or type(s) of data structure(s) and/or file(s). For example ALM project information may be stored using LOM files that define an inventory of ALM entities, the relations between the entities, and per action traversal rules for those relations. In some examples, LOM files are extensible in that a LOM file can include other LOM files. Some ALM entities of a LOM file may be assigned subtypes used by the autocompletor 132 to refine and/or negate traversal rules when traversal is not applicable for a particular subtype. For example, an automated test subtype is not allowed to include design steps, thereby obviating the need for the autocompletor 132 to include any associated design entities and/or relations while traversing the ALM repository 135. The example ALM repository and/or database 135 may be implemented by any number and/or type(s) of volatile and/or non-volatile memory(-ies), memory device(s) and/or storage device(s). In some examples, the ALM repository and/or database 135 is stored and/or implemented at the example workstation 100. Additionally or alternatively, the ALM repository and/or database 135 may be implemented at another device such as another workstation and/or a server accessed via, for example, a local-area network and/or a wide-area network.

To access the example ALM repository and/or database 135, the example workstation 100 of FIG. 1 includes a repository and/or database interface 140. The example repository and/or database interface 140 of FIG. 1 implements any number and/or type(s) of application programming interface(s), message(s) and/or protocol(s) to enable the ALM module 120 and/or other portions of the example workstation 100 to access, store, write and/or modify ALM information stored in the ALM repository and/or database 135.

While an example workstation 100 configured and/or programmed to autocomplete ALM entities is illustrated in FIG. 1, one or more of the interfaces, elements and/or devices illustrated in FIG. 1 may be combined, divided, re-arranged, omitted, eliminated and/or implemented in any other way. Further, the example user interface module(s) 105, the example display device(s) 110, the example input device(s) 115, the example ALM module 120, the example ALM core 125, the example baseliner 130, the example copier 131, the example autocompletor 132, the example ALM repository and/or database 135, the example repository and/or database interface 140 and/or, more generally, the example workstation 100 may be implemented by the example process platform P100 of FIG. 3 and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. When any apparatus claim of this patent incorporating one or more of these elements is read to cover a purely software and/or firmware implementation, at least one of the example user interface module(s) 105, the example display device(s) 110, the example input device(s) 115, the example ALM module 120, the example ALM core 125, the example baseliner 130, the example copier 131, the example autocompletor 132, the example ALM repository and/or database 135, the example repository and/or database interface 140 and/or, more generally, the example workstation 100 is hereby expressly defined to include a tangible article of manufacture such as a tangible machine-readable medium storing machine-readable instructions such as the firmware and/or software. Further still, the example workstation 100 may include interfaces, elements and/or devices instead of, or in addition to, those illustrated in FIG. 1, and/or may include more than one of any or all of the illustrated interfaces, elements and/or devices.

Figure 2:
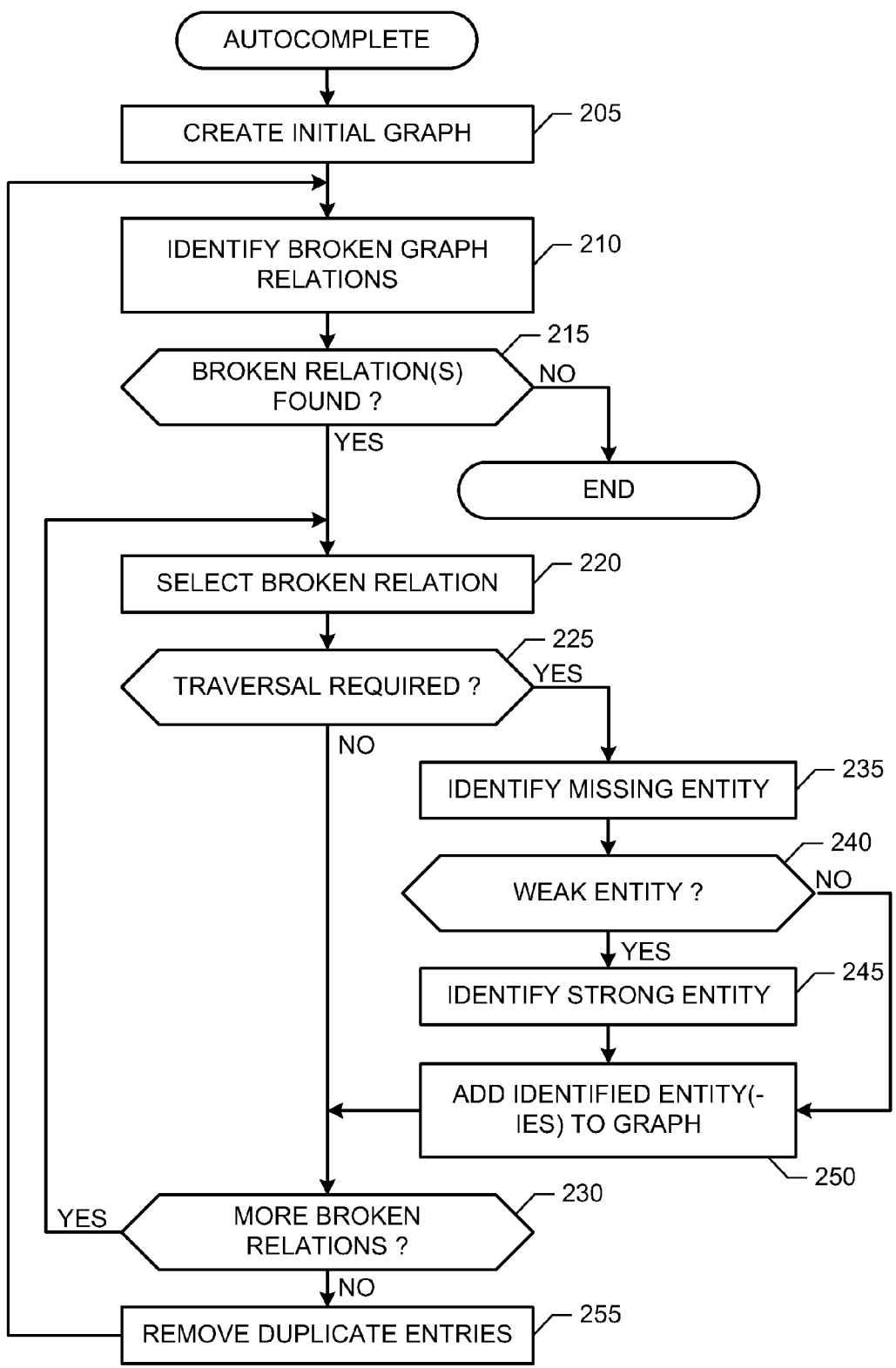
FIG. 2 illustrates an example process that may, for example, be implemented using machine-readable instructions executed by one or more processors to implement the example autocompletor of FIG. 1 and/or to autocomplete ALM entities.

FIG. 2 is a flowchart of an example process that may, for example, be implemented as machine-readable instructions carried out by one or more processors to implement the example autocompletor 132 of FIG. 1 and/or to autocomplete one or more ALM entities given an action. For ease of discussion, the example process of FIG. 2 will be described with reference to autocompleting a single ALM entity. However, the example process of FIG. 2 may be carried out to autocomplete any number and/or type(s) of ALM entities. The example machine-readable instructions of FIG. 2 begin with the example autocompletor 132 creating an initial ALM graph starting with an initial ALM entity from a LOM file representing an ALM model (block 205). In some examples, the autocompletor 132 creates the ALM graph using a query generator that generates an ordered series of SQL queries based on the LOM file and any defined subtypes.

The autocompletor 132 identifies any broken relations in the ALM graph (block 210). A broken relation is a relation that is only logically connected to an entity at one end. If no broken relations are identified (block 215), control exits from the example machine-accessible instructions of FIG. 2.

If at least one broken relation is found (block 215), the autocompletor 132 selects a broken relation (block 220) and determines whether traversal of the broken relation is needed and/or required (block 225). The autocompletor 132 determines whether the broken relation needs to be traversed based on (a) whether the relation is needed to complete the action, (b) subtype traversal rules and (c) the user-defined and/or user-configurable rules 133. If at least one of the conditions is not met (block 225), then control proceeds to block 230 to determine whether there is another broken relation to process.

If all three of the conditions are met (block 225), the autocompletor 132 identifies the missing ALM entity (block 235). In some examples, the identified missing ALM entity is added to the set of ALM entities identified by the autocompletor 132 even when the user-defined and/or user-configurable rules 133 exclude the identified missing ALM entity.

If the identified missing ALM entity is weak and/or dependent (e.g., it cannot be used alone as is) (block 240), the autocompletor 132 identifies the independent and/or strong ALM entity on which is depends (block 245). The identified ALM entities are add to the set of ALM entities and/or relations and, thus, to the ALM graph (block 250). For example, if the identified missing ALM entity is a test, the folder (ALM entity) containing the test is identified and added. If the folder contains other tests than those identified by the autocompletor 132 they are, however, not included. Control then proceeds to block 230.

The autocompletor 132 determines whether there are more broken relations to process (block 230). If there are more broken relations to process (block 230), control returns to block 220 to select another broken relation.

If there are no more broken relations to process (block 230), the autocompletor 132 removes any duplicate ALM entities and/or relations contained in the ALM graph (block 255). For example, if two different folder entities with a hierarchical relationship were added, the lower (e.g., dependent) folder may be removed. Control then returns to block 210 to identify whether any new broken relations have been introduced.

A processor, a controller and/or any other suitable processing device may be used, configured and/or programmed to execute and/or carry out the example machine-readable instructions of FIG. 2. For example, the example process of FIG. 2 may be embodied in program code and/or machine-readable instructions stored on a tangible computer-readable medium accessible by a processor, a computer and/or other machine having a processor such as the example processor platform P100 of FIG. 3. Machine-readable instructions comprise, for example, instructions that cause a processor, a computer and/or a machine having a processor to perform one or more particular processes. Alternatively, some or all of the example machine-readable instructions of FIG. 2 may be implemented using any combination(s) of fuses, ASIC(s), PLD(s), FPLD(s), FPGA(s), discrete logic, hardware, firmware, etc. Also, some or all of the example machine-readable instructions of FIG. 2 may be implemented manually or as any combination of any of the foregoing techniques, for example, any combination of firmware, software, discrete logic and/or hardware. Further, many other methods of implementing the example process of FIG. 2 may be employed. For example, the order of execution may be changed, and/or one or more of the blocks and/or interactions described may be changed, eliminated, sub-divided, or combined. Additionally, any or all of the example machine-readable instructions of FIG. 2 may be carried out sequentially and/or carried out in parallel by, for example, separate processing threads, processors, devices, discrete logic, circuits, etc.

As used herein, the term "tangible computer-readable medium" is expressly defined to include any type of computer-readable medium and to expressly exclude propagating signals. As used herein, the term "non-transitory computer-readable medium" is expressly defined to include any type of computer-readable medium and to exclude propagating signals. Example tangible and/or non-transitory computer-readable medium include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a network-attached storage device, a server-based storage device, a shared network storage device, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 3.

Figure 3:
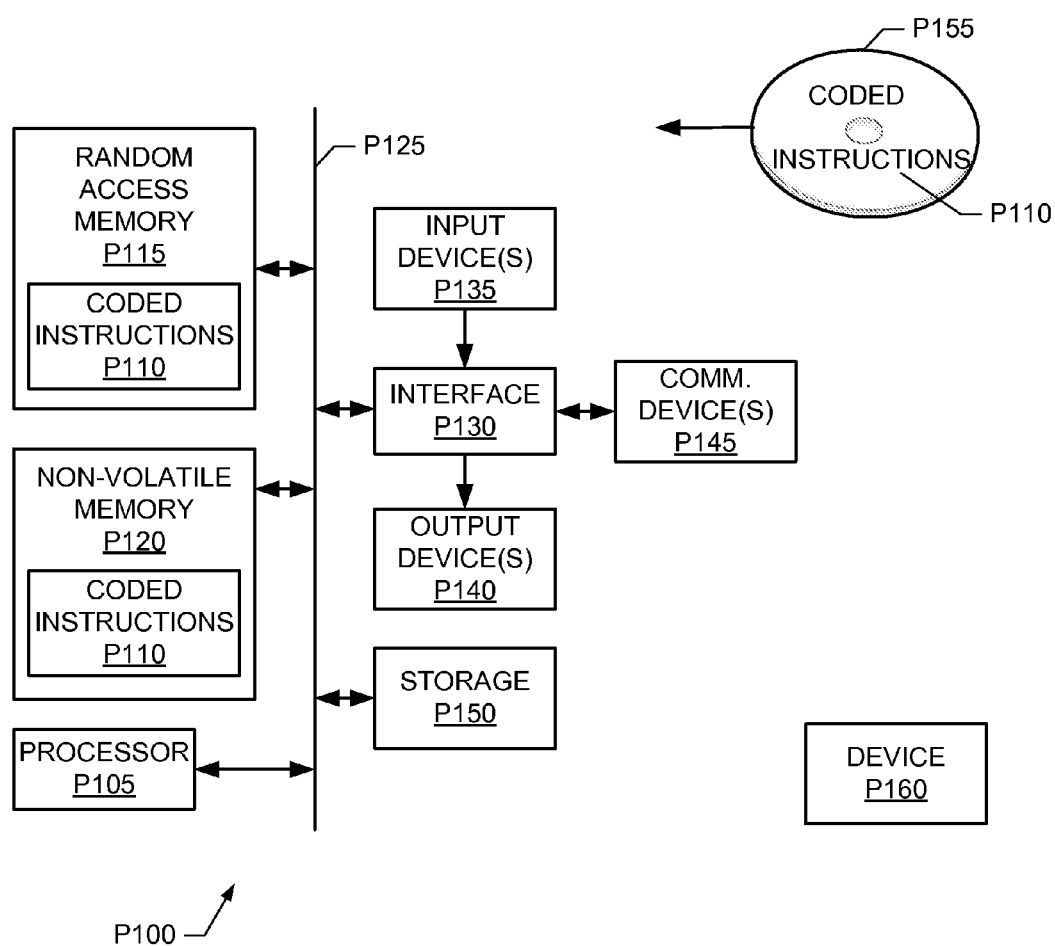
FIG. 3 is a schematic illustration of an example processor platform that may be used and/or programmed to implement the example workstation of FIG. 1 and/or to execute the example machine-readable instructions of FIG. 2 to autocomplete ALM entities.

FIG. 3 illustrates an example processor platform P100 capable of executing the example instructions of FIG. 2 to implement the example autocompletor 132, the example workstation 100 and/or, more generally, to autocomplete an ALM entity. The example processor platform P100 can be, for example, a personal computer, a workstation, a server, and/or any other type of computing device containing a processor.

The processor platform P100 of the instant example includes at least one programmable processor P105. For example, the processor P105 can be implemented by one or more Intel®, AMD®, and/or ARM® microprocessors. Of course, other processors from other processor families and/or manufacturers are also appropriate. The processor P105 executes coded instructions P110 present in main memory of the processor P105 (e.g., within a volatile memory P115 and/or a non-volatile memory P120), in a storage device P150 and/or stored on a removable computer-readable storage medium P155 such as a CD, a DVD, a floppy disk and/or a FLASH drive. The processor P105 may execute, among other things, the example machine-readable instructions of FIG. 2 to autocomplete an ALM entity. Thus, the coded instructions P110 may include the example instructions of FIG. 2.

The processor P105 is in communication with the main memory including the non-volatile memory P120 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory P120 may be implemented by flash memory, and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

One or more input devices P135 are connected to the interface circuit P130. The input device(s) P135 permit a user to enter data and commands into the processor P105. The input device(s) P135 can be implemented by, for example, a keyboard, a mouse, a touchscreen, a track-pad, a trackball, isopoint and/or a voice recognition system.

One or more output devices P140 are also connected to the interface circuit P130. The output devices P140 can be implemented, for example, by display devices (e.g., a liquid crystal display, a cathode ray tube display (CRT), a printer and/or speakers). The interface circuit P130, thus, typically includes a graphics driver card.

The interface circuit P130 may also include one or more communication device(s) P145 such as a network interface card to facilitate exchange of data with other computers, nodes and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive, and/or any other solid-state, magnetic and/or optical storage device. The example storage devices P150 may be used to, for example, store the example instructions of FIG. 2. Additionally or alternatively, the coded instructions P110 may be obtained from a communicatively coupled device P160 such as an external floppy disk drive, an external hard disk drive, an external solid-state hard disk drive, an external CD drive, an external DVD drive a server, a network-attached storage device, a server-based storage device, and/or a shared network storage device from which the coded instructions P110 may be downloaded and/or installed. The device P160 may, for example, be communicatively coupled to the processor platform P100 via the communication devices P145 and/or the interface P130. In some examples, the removable storage medium P155 and/or the device P160 contains, includes and/or stores an installation package and/or program including the coded instructions P110.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method to autocomplete an application lifecycle management (ALM) entity, the method comprising:
    determining an action associated with the ALM entity;
    tracing an ALM repository starting with the ALM entity to automatically identify a connected set of entities and relationships, wherein the connected set includes all entities and relationships required to carry out the action without including any unneeded entities or relationships, wherein tracing the ALM repository comprises:
        identifying descendants of the ALM entity and relations connected to the descendants; and
        adding the descendants and the relations to the connected set of entities and relationships;
    identifying a broken one of the relations connected to only a single entity in the connected set of entities and relationships;
    identifying an additional entity connected to the broken one of the relations that is not already included in the connected set of entities and relationships; and
    adding the additional entity to the connected set of entities and relationships that are required to carry out the action without including any unneeded entities or relationships.

2. A method as defined in claim 1, further comprising removing a duplicate entity from the connected set of entities and relationships.

3. A method as defined in claim 1, further comprising:
    identifying additional descendants of the entities in the connected set of entities and relationships;
    identifying additional relations connected to the additional descendants; and
    adding the additional descendants and the additional relations to the connected set of entities and relationships.

4. A method as defined in claim 1, further comprising applying a filter to the descendants and the relations to exclude one or more of the descendants and the relations, wherein the excluded one or more of the descendants and the relations are not included in the connected set of entities and relationships.

5. A method as defined in claim 1, wherein the action comprises at least one of capturing a snapshot of the ALM entity, copying the ALM entity from a first project to a second project, or creating a filtered set of entities including the ALM entity.

6. A method as defined in claim 1, further comprising determining whether the one of the relations is required to be traversed based on a) whether the one of the relations is needed to complete the action, b) a subtype traversal rule, and c) a user-configured rule, the identifying of the additional entity being based on determining that the one of the relations is required to be traversed.

7. A tangible computer-readable medium comprising machine-readable instructions that, when executed, cause a machine to at least:
    determine an action associated with an application lifecycle management (ALM) entity; and
    trace an ALM repository starting with the ALM entity to automatically identify a connected set of entities and relationships, the identified entities and relationships being required to carry out the action without including any unneeded entities or relationships, the instructions to cause the machine to trace the ALM repository by:

identifying descendants of the ALM entity and relations connected to the descendants; and adding the descendants and the relations to the connected set of entities and relationships;

identify a broken one of the relations connected to only a single entity in the connected set of entities and relationships;

identify an additional entity connected to the broken one of the relations that is not already included in the connected set of entities and relationships; and add the additional entity to the connected set of entities and relationships that are required to carry out the action without including any unneeded entities or relationships.

8. A tangible computer-readable medium as defined in claim 7, wherein the machine-readable instructions, when executed, further cause the machine to remove a duplicate entity from the connected set of entities and relationships.

9. A tangible computer-readable medium as defined in claim 7, wherein the machine-readable instructions, when executed, further cause the machine to:

identify additional descendants of the entities in the connected set of entities and relationships;

identify additional relations connected to the additional descendants; and add the additional descendants and the additional relations to the connected set of entities and relationships.

10. A tangible computer-readable medium as defined in claim 7, wherein the machine-readable instructions, when executed, cause the machine to apply a filter to the descendants and the relations to exclude one or more of the descendants and the relations, wherein the excluded one or more of the descendants and the relations are not included in the connected set of entities and relationships.

11. An apparatus to autocomplete an application lifecycle management (ALM) entity, the apparatus comprising:

an interface to determine an action associated with the ALM entity; and an autocompletor comprising a processor, the autocompletor to trace an ALM repository starting with the ALM entity to automatically identify a connected set of entities and relationships, the identified entities and relationships being required to carry out the action without including any unneeded entities or relationships, wherein the autocompletor is to trace the ALM repository by identifying descendants of the ALM entity and relations connected to the descendants, and adding the descendants and the relations to the connected set of entities and relationships, and the autocompletor is further to:

identify a broken one of the relations connected to only a single entity in the connected set of entities and relationships;

identify an additional entity connected to the broken one of the relations that is not already included in the connected set of entities and relationships; and add the additional entity to the connected set of entities and relationships that are required to carry out the action without including any unneeded entities or relationships.

12. An apparatus as defined in claim 11, further comprising a computer-readable storage medium to store the ALM repository.

13. An apparatus as defined in claim 11, further comprising a communication interface to communicatively couple the apparatus to the ALM repository.

* * * * *